FIG. 2
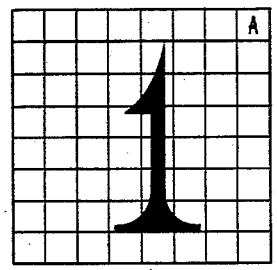
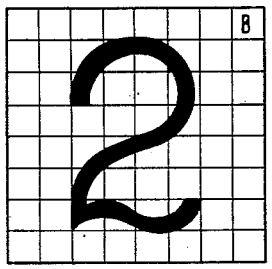
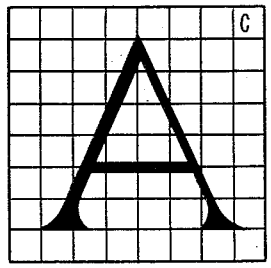
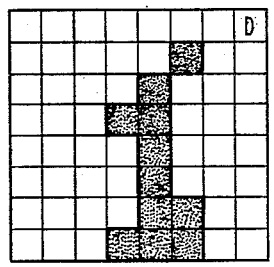
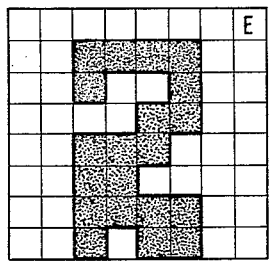
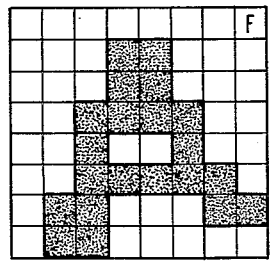
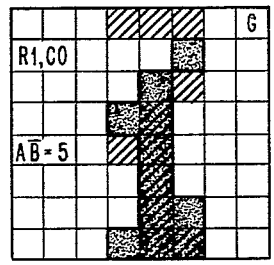
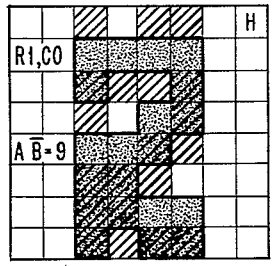
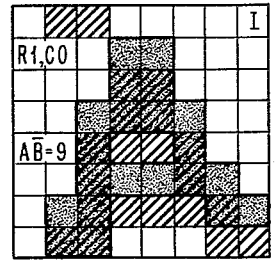
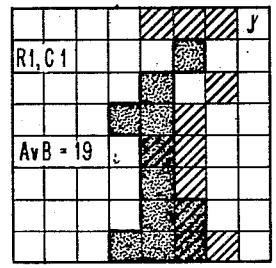
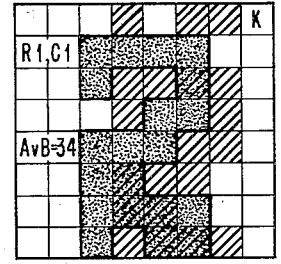
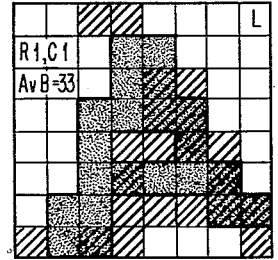
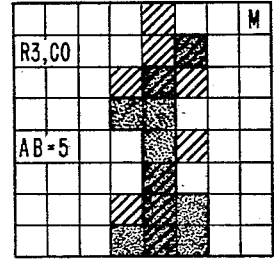
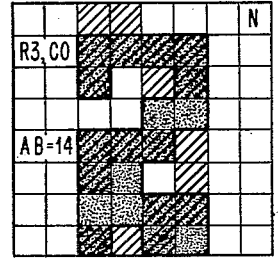
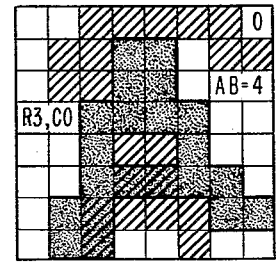

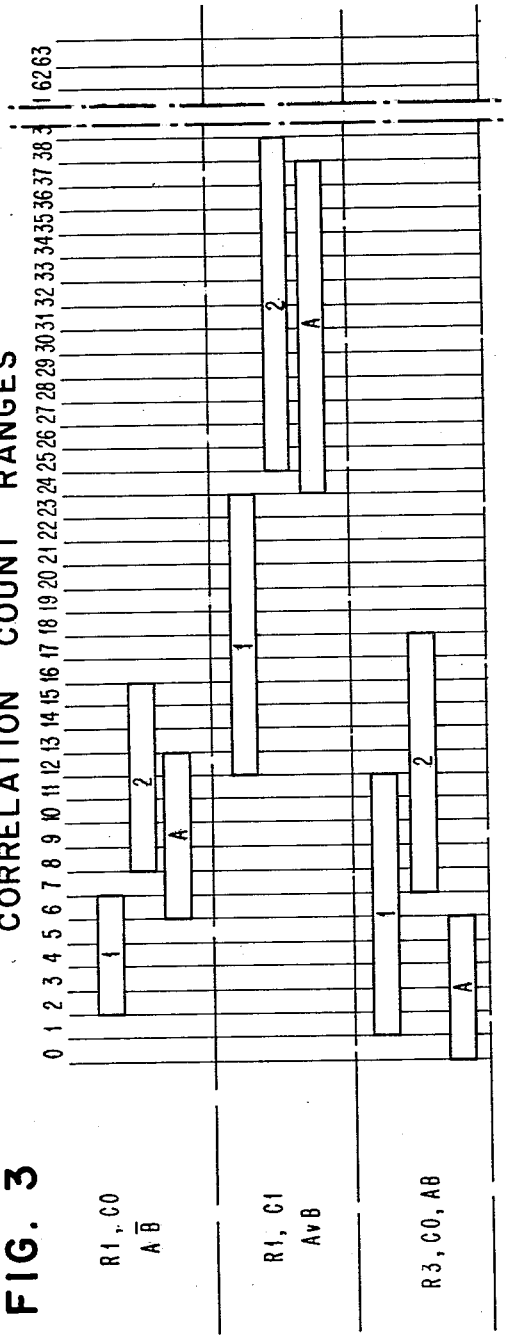

Oct. 6, 1964

G. H. SWIFT, JR 3,152,318

CHARACTER RECOGNIZER

Filed Feb. 16, 1961

United States Patent Office 3,152,318
Patented Oct. 6, 1964

3,152,318
CHARACTER RECOGNIZER
George H. Swift, Jr., Poughkeepsie, N.Y., assignor to International Business Machines Corporation, New York, N.Y., a corporation of New York
Filed Feb. 16, 1961, Ser. No. 89,707
5 Claims. (Cl. 340—146.3)

This invention relates to electronic character recognition systems, and particularly to a character recognition system which treats a scanned character as a pattern of binary bits, manipulates the character pattern to each of several checkpoint posture patterns, correlates each checkpoint posture pattern with the original character pattern according to specified logical connectives, and thereby produces an array of correlation functions upon which recognition programs can base a recognition.

Character recognizers in the prior art have generally operated by the direct comparison of a character pattern with a reference character pattern. Such character recognizers have been feasible where the character alphabet is kept small as in numeric character recognizers, but become unwieldy as the size of the alphabet increases. Registration of the unknown character must be held within exact tolerances or the comparison with the reference character is not effective.

Registration of the scanned unknown character ceases to be a problem when an autocorrelation function, rather than the original scanned unknown character, is the basis for recognition. Autocorrelation functions are derived by comparing the original character pattern for coincidence with a subsequent pattern derived from a shift of the character pattern to a distorted posture.

It is an object of this invention to derive correlation functions according to a plurality of logical connectives at a plurality of character posture checkpoints and to provide for character recognition by examination of correlation counts at each posture checkpoint for each of a plurality of logical connectives.

A feature of the invention is the combination of a scan register unit, posture register unit, program unit and scanner with a plurality of logical connect boxes each having a particular logical connective assigned. A correlation counter and set of correlation count registers, associated with each logical connect box, controlled by the program unit to take correlation counts at the various specified character posture checkpoints, make correlation counts available for character recognition according to combinatorial patterns of correlation counts.

An advantage of the invention is its compatibility with the usual provisions of a general purpose data processor which can be used to provide programmable backup of the character recognizer. The data processor can accomplish final recognition logic based on the correlation counts, and can enhance recognition capability in case of blurred or otherwise unrecognizable characters by contextual or statistical prediction.

The foregoing and other objects, features and advantages of the invention will be apparent from the following more particular description of a preferred embodiment of the invention, as illustrated in the accompanying drawings.

In the figures:

FIG. 2 is a composite diagram of three characters and the related character patterns together with a demonstrative set of checkpoint posture patterns superimposed on the character patterns.

FIG. 3 is a chart of the various correlation count ranges for the three characters illustrated in FIG. 2 and the specific logical connectives chosen for illustration in the illustrative embodiment. Correlation counts of acceptable characters are shown on a scale against each of three posture checkpoints and each of three logical connectives.

FIG. 4 is a timing chart of the character recognition system.

The illustrative embodiment is limited to structure to recognize and differentiate between characters 1, 2, and A. For recognition of a larger alphabet, more intense logic according to the teachings illustrated in FIG. 5 must be provided. A more effective management of the final character recognition logic, however, is by programming of the digital computer.

Figure 1:
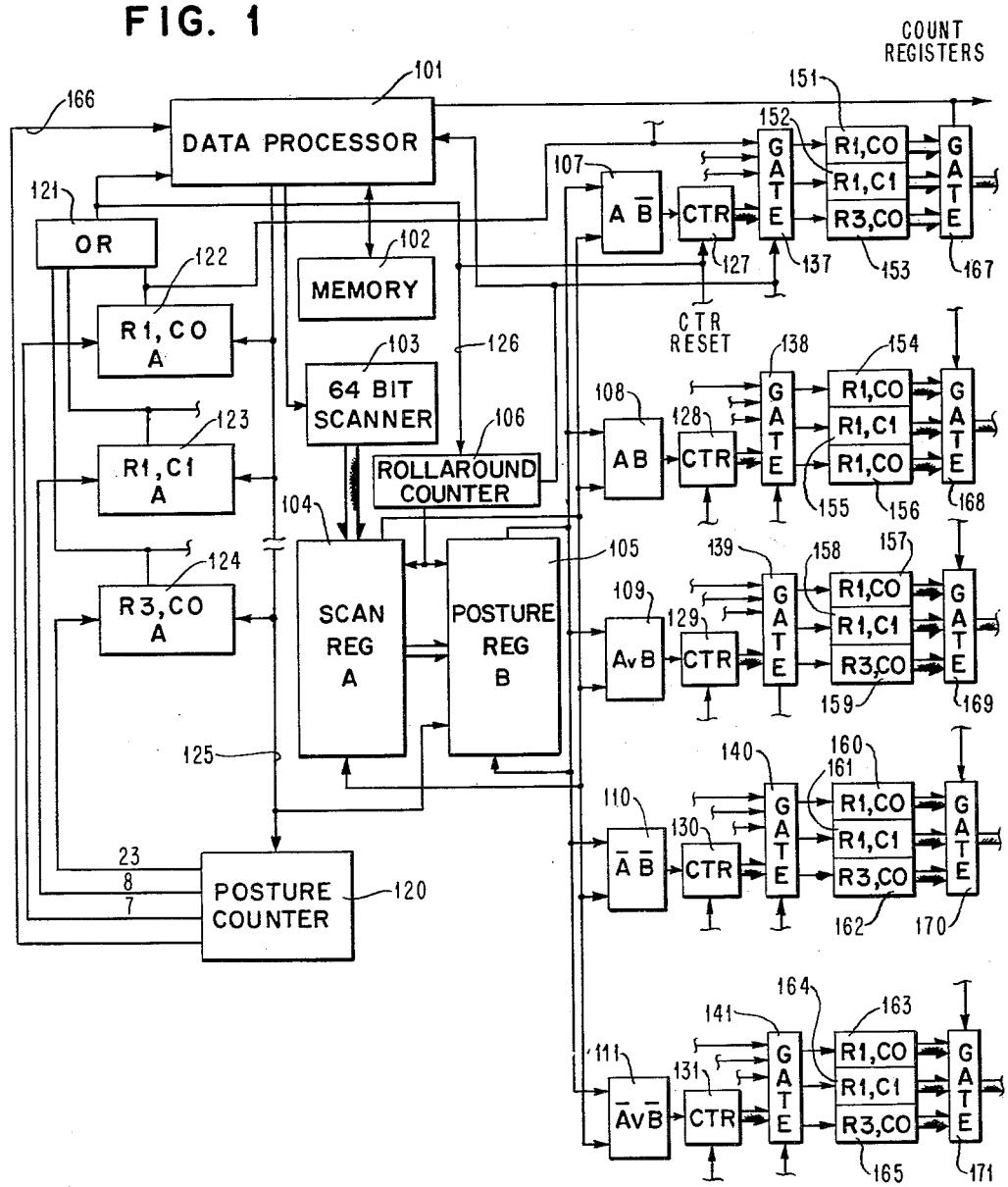
FIG. 1 is a block diagram of the character recognition system.

*FIGURE 1.—Character Recognition System*

General purpose data processor 101, which may, for example, be an IBM Type 7090, is equipped with memory 102 and 64-bit scanner 103. Data processor 101 provides general control of the character recognition sequence. The scanner may be a commercial photoelectric scanner which converts a chosen character position into a character pattern of binary signals according to the occurrence of black or non-occurrence of black in each of 64 squares in an 8 x 8 grid which is the scan area for a single character. The character pattern may be derived from scanner 103, or, more advantageously, may be recorded on a magnetic tape in an off-line fashion and introduced to scan register A via data processor 101 and connectives not shown. The output of scanner 103 is fed to 64-bit scan register A (104) 64 bits in parallel. Scan register A is connected to posture register 105 for 64-bit parallel transfer of the character pattern. Both the scan register and the posture register are connected to 64-bit rollaround counter 106 which provides sixty-four pulses to shift the contents of the scan and posture registers out onto output lines and back to their original positions in the registers. Under control of the rollaround counter, the contents of the scan and posture registers (64-bit patterns) are read out together, one bit at a time, to logical connect boxes 107–111 and simultaneously back to the scan and posture registers so that, after rollaround, the contents of the scan and posture registers remain exactly as before, and the output of each register has serially received the entire register contents. This function can be termed "serial rollaround past an output."

The program unit includes posture counter 120, posture checkpoint OR circuit 121 and posture checkpoint AND circuits 122, 123 and 124. The purpose of the program unit is to provide a finite number of checkpoints at which correlation functions between the scan register and the posture register may be taken for character recognition. A signal pulse on line 125 from data processor 101 shifts posture register 105 one position and steps posture counter 120 one unit. Posture counter 120 provides signals at each of several predesignated values including, in the preferred embodiment, 7, 8 and 23. Posture counter 120 includes internal delay or a delay element which prevents value signals from changing during the step pulse. See Richards, Arithmetic Operations in Digital Computers, chapter 7, for details of electronic counters. Richards explains shift registers in chapter 5, particularly in pages 144–148.

During the operation sequence, under data processor control, the 64-bit scanner provides a 64-bit character pattern of binary bits to scan register 104. Posture register 105 is immediately set to the character pattern. Thereafter, posture register 105 is shifted one position and posture counter 120 stepped one. Since the 8 x 8 scan matrix can be thought of as a straight 64-bit register pattern, various shifts can be thought of as providing a roll by row or by column or combinations of the two, to each of several checkpoint character postures. For example, a roll of one row (and zero columns) equals a shift of 8, which is recognized by a 7 output from posture checkpoint logic 121 to posture checkpoint AND circuit 122 and the step pulse on line 125. The output R1, C0 (shift 8) from posture checkpoint AND circuit 122 passes via posture checkpoint OR circuit 121 and line 126 to rollaround counter 106 and to correlation counters 127 to 131. Data processor 101 emits step pulses rapidly for stepping past unused checkpoints; any output from checkpoint OR circuit 121 delays further step pulses from the data processor sufficiently to allow a rollaround operation.

Under control of rollaround counter 106, the content of scan register A and posture register B (which has been shifted 8 positions to the R1, C0 checkpoint), passes to logical connect blocks 107–111. Correlation counters 127–131 count the number of occurrences of the appropriate logical correlation between the scan and posture registers. Richards Arithmetic Operations in Digital Computers, chapter 2 explains notation for common logical connectives such as: Logical AND of signals A, B is (AB). Logical OR of signals A, B is written $(A+B)$ or is written (AvB). Richards also explains the notation for complement or the "not" function of a signal. The complement of signal A is $\bar{A}$; the complement of B is $\bar{B}$. A composite signal which is the logical AND of signal not A, signal not B and signal not C is written $\overline{ABC}$. The logical AND of signals A, "not B" is written $A\bar{B}$. The contents of scan register 104 (A or $\bar{A}$ for a particular bit position) and the contents of posture register 105 (B or $\bar{B}$ for a particular bit position) are made available each one position at a time to logical connect boxes 107–111. At a given time, the composite output of the scan register and the posture register can be:

AB—1 bit in the output position of each register;
$A\bar{B}$—scan register output position 1 bit, posture register output position 0 bit;
$\bar{A}B$—scan register output position 0 bit, posture register output position 1 bit;
$\overline{AB}$—0 bit at output position of scan register and posture register.

These four combinations of two binary bits provide many logical connectives including the following:

| | |
|---|---|
| AB | A and B. |
| $A\bar{B}$ | A and "not B." |
| $\overline{AB}$ | "not A" and "not B." |
| $\bar{A}B$ | "not A" and B. |
| A | A don't care B. |
| $\bar{A}$ | "not A" don't care B. |
| B | B don't care A. |
| $\bar{B}$ | "not B" don't care A. |
| AvB | A or B. |
| $\bar{A}$vB | "Not A" or B. |
| Av$\bar{B}$ | or "not B." |
| $\bar{A}$v$\bar{B}$ | "not A" or "not B." |
| A⊻B | A exclusive —OR B. |
| 0 | No output. |

For example, logical connect box $A\bar{B}$ 107 provides input to its associated correlation counter 127 for occurrences of the 1 bit in scan register A 104 simultaneous to the 0 bit in posture register B 105. Correlation counter 127 may be a 6-stage binary counter capable of counting from 0 to 63 and providing parallel output via gate 137 to an associated correlation count register.

Logical connect block AB 108 accepts inputs from scan register A 104 and posture register B 105 and provides output to its correlation counter 128 upon simultaneous occurrence of 1 bits. Correlation counter 128 provides 6-bit binary count values via gate 138 to an associated correlation count register.

AvB block 109 similarly provides outputs to its associated correlation counter 129 upon occurrence of a 1-bit at the output of either scan register A 104 or posture register B 105; correlation counter 129 via gate 139 provides 6-bit parallel input to an associated correlation count register.

Logical connect block $\overline{AB}$ 110 provides count input to its associated correlation counter 130 upon simultaneous occurrence of 0-bits at the outputs of scan register A 104 and posture register B 105. Gate 140 connects the output of correlation counter 130 to an associated correlation count register.

Logical connect block $\bar{A}$v$\bar{B}$ 111 similarly provides count input to its associated correlation counter 131 upon the occurrence of a 0-bit value at the output of either scan register A 104 or posture register B 105. Gate 141 directs the 6-bit binary value of correlation counter 131 to an associated correlation count register.

Correlation count registers 151–165 are in sets of three connected to correlation count registers 127–131 via gates 137–141. The correlation count registers are preferably electronic set-reset trigger registers of six binary bit capacit. Each set includes a register for recording the correlation count for its associated logical connective at each of the several posture checkpoints involved. In the embodiment shown, each set contains three correlation count registers. The R1, C0 register in each set (151, 154, 157, 160, 163) is gated to receive the correlation count as rollaround counter 106 returns to home position to end the rollaround for the R1, C0 posture checkpoint. Gates 137–141 are not shown in detail; the logic for input to R1, C0 correlation count registers 151, 154, 157, 160, 163 is R1, C0 AND 122 "and" rollaround counter 106 home position. To avoid confusion of too many lines in FIG. 1, connections to most correlation counters and gates are shown broken off at pigtails.

In a system for recognizing large alphabets of character patterns, magnetic core registers are more economical than transistors. A magnetic core array and suitable addressing mechanism can register correlation counts for numerous checkpoints with economy.

As rollaround counter 106 returns to the home position, data processor 101 receives a signal to resume stepping of posture register 105 to a subsequent checkpoint. As subsequent checkpoints R1, C1 and R3, C0 are reached, rollaround counter 106 reads out the contents of scan register A 104 and posture register B 105 to the logical connect blocks 107–111. At termination of each rollaround, correlation count registers 151–165 record the related correlation counts.

After the last checkpoint has been the subject of the full checkpoint cycle of rollaround, count and recording of correlation counts, data processor 101 provides an additional step pulse along line 125. Posture counter 120 steps to provide a signal on line 166 which returns to data processor 101 to initiate recognition proceedings based on the full range of correlation counts stored in correlation count registers 151–165. This recognition is most economically done by programming of the data processor.

*FIGURE 2.—Checkpoint Patterns*

Three characters are shown, as they appear to the scanner, in the top row. The second row shows the bit structure of the scan character patterns. Any block in a bit area normally provides a block (1) bit. A small amount of clockwise skew resulted in the character patterns of the second row. The character pattern is retained in the scan register.

In the third row, the character pattern from the scan register is shown with the posture register pattern at checkpoint R1, C0 superimposed. In the R1, C0 position, the posture register pattern may be considered in FIG. 3 as shifted down 1 row and 0 column relative to the scan register pattern. The $A\bar{B}$ correlation at this checkpoint is five bits for the character 1, nine bits for the character 2, or nine bits for the character A. In the three character alphabet of the embodiment shown, correlation $A\bar{B}$ at the R1, C0 checkpoint differentiates between the character 1 and the other characters, but not between 2 and A.

In the fourth row, the character pattern is superimposed on the posture register pattern at checkpoint R1, C1. Logical connective AvB provides counts of 19, 34 and 33 for respective characters 1, 2 and A. In the R1, C1 position, the posture pattern may be considered in FIG. 3 as being shifted down 1 row and to the right one column relative to the register pattern. This correlation checkpoint confirms the analysis of the R1, C0, $A\bar{B}$ correlation in that it isolates the character 1 from characters 2 and A.

In the fifth row, the character pattern and posture register pattern at the R3, C0 (shift 3 rows and 0 columns) checkpoint are shown. Logical connective AB provides correlation counts of 5, 14 and 4 for respective characters 1, 2 and A at the R3, C0 checkpoint. This connective at this checkpoint differentiates between the character 2 and the other characters.

Correlation counts are not affected by vertical or horizontal registration shifts of full rows or columns. Distortions of the character pattern occur due to the black edge of a character falling directly on the border between two rows or two columns, or due to clockwise or counterclockwise skew. These distortions, however, occur in predictable patterns so that the correlation counts for any chosen character fall within a predictable range. Correlation count ranges for characters of a given type font can be developed experimentally or by statistical methods.

*FIGURE 3.—Correlation Count Ranges*

Correlation count ranges for characters of the type font shown in FIG. 2 are graphically presented. The range for the character A at checkpoint R1, C0 and connective $A\bar{B}$ is 6–13; this range slightly overlaps the 2–7 range for character 1 but heavily overlaps the range 8–16 for character 2. Special combinations of checkpoints, ranges and connectives are chosen to differentiate a particular character from all others.

*FIGURE 4.—Timing Chart*

One character cycle is shown, which is divided up into several checkpoint times. At the home checkpoint time, a character to be recognized is scanned and the character pattern generated. In FIG. 1, the character pattern passes to scan register 104 and to posture register 105. Data processor 101 ends home time by providing a pulse on line 125 to shift the posture register to R0, C1 and step posture counter 120 to 1. Since this is not a checkpoint, step pulses continue to be sent from data processor 101 until the R1, C0 checkpoint is reached and checkpoint OR circuit 121 delays further stepping to allow for the rollaround operation. Rollaround counter then emits 64 pulses to read out and return the character pattern and posture pattern to registers 104 and 105 respectively. As the rollaround operation terminates, count register gates transfer the correlation count for R1, C0 to the R1, C0 register in the set of correlation count registers for each logical connective used.

Checkpoints R1, C0; R1, C1; R3, C0; and, if further checkpoints are needed, RM, CM up to RN, CN are traversed, each with rollaround, connect and correlation count storage. After the last checkpoint, a further step pulse produces a RECOGNIZE signal on line 166, whereupon recognition programs or logic take effect. Recognition at this time is based on analysis of combinations of correlation counts.

Figure 5:
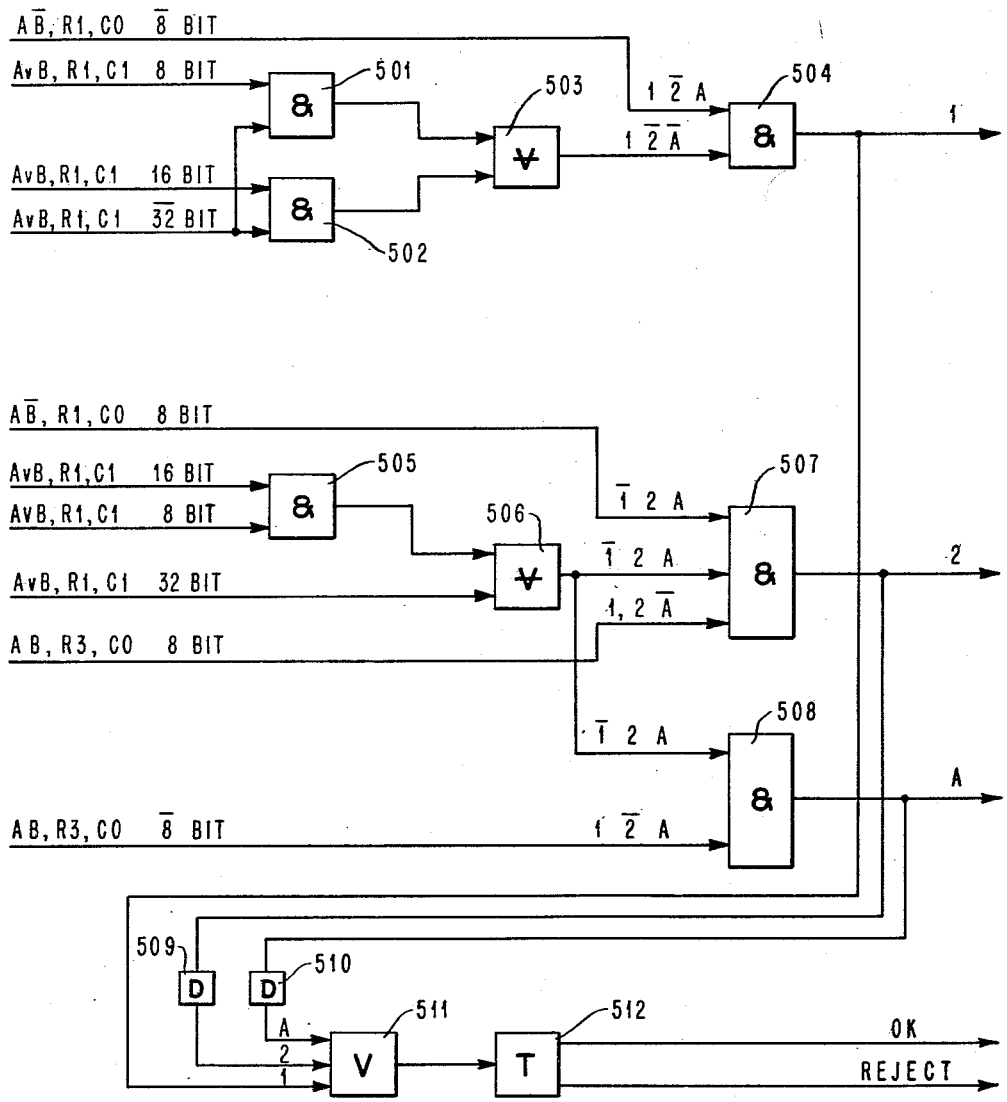
FIG. 5 is a schematic diagram of recognition logic for characters 1, 2 and A.

*FIGURE 5.—Recognition Logic*

Correlation counters 127–131 (FIG. 1) and correlation count registers 151–165 produce binary correlation counts which are available during recognition time. The bit structure is 1–2–4–8–16–32, with combinations making decimal values 0–63 available.

Acceptable correlation counts fall within ranges; it is often possible to cover a range with two or three bits, with only a small amount of logic. The 16 bit, for example, is effective to define count range (16–31 and 48–64). Count range 16–31 is defined by the 16 bit and the complement of the 32 bit ($\overline{32}$ bit).

The logic illustrated in FIG. 5 recognizes the character 1 over most of its acceptable correlation count ranges. The $\bar{8}$ bit signal from correlation count register $A\bar{B}$, R1, C0 (151, FIG. 1) occurs in ranges 8–15, 24–31, 40–47 and 56–63. FIG. 3 shows a range of 8–16 for the 2. Except for the 16 at the top of the 2 range, all counts for the 2 range require the 8 bit. The 16 count possibility is ignored, and the $A\bar{B}$, R1, C0, $\bar{8}$ bit signal treated as $\bar{2}$.

Logical blocks 501, 502, 503 and 504 are used. The output of AND block 501 is (AvB, R1, C1) (8 bit and $\overline{32}$ bit) which defines correlation count range AvB, R1, C1, 8–15, 24–31; the output of AND block 502 is (AvB, R1, C1) (16 bit and $\overline{32}$ bit) which defines correlation count range AvB, R1, C1, 16–31. Since in the range 24–31 both 8 bit and 16 bit appear, Exclusive OR block 503 defines the range AvB, R1, C1, 8–23 which includes all of the 11–23 range for the character 1. This range excludes character 2 and virtually excludes the A; a small possibility of confusion remains since the acceptable ranges for characters 1 and A overlap slightly at all checkpoints. This overlap is only at count 23 for connective AvB, R1, C1.

Any uncompensated overlap of ranges during recognition will result in multiple recognition of, for example, both 1 and A. The problem is detected by simple means. Data processor 101 (FIG. 1) may then differentiate by context (FLAG is more likely than FL1G) between the characters A and 1 or may order a second scan.

The inputs to AND block 504 are $\bar{2}$ and ($\bar{2}\cdot\bar{A}$); inductive reasoning prescribes, in the limited alphabet embodiment, recognition of the 1.

Recognition of the character 2 is similar. The $A\bar{B}$, R1, C0, 8 bit eliminates the character 1. The AB, R3, C0, 8 bit eliminates the character A. The output of AND block 505 spans the ranges AvB, R1, C1, 24–31, 56–63; the output of Exclusive OR block 506 spans the range AvB, R1, C1, 32–63. Exclusive OR block 506 eliminates the character 1 and defines the range AvB, R1, C1, 24–40, which includes the character 2 range AvB, R1, C1, 24–38. AND block 507, with inputs $\overline{12A}$, $\overline{12A}$ and $12\bar{A}$, produces the character 2 recognition signal upon coincidence of inputs.

The character A is recognized by a logical block 508. The output of AND block 505 is the range AvB, R1, C1, 24–31, 56–63. The output of Exclusive OR block 506 is the range AvB, R1, C1, 24–40 which includes portions of the 2 and A ranges but excludes the 1 range. AB, R3, C0, $\bar{8}$ bit spans the range 0–7 which excludes the 2 range; the output of AND block 508 is thus $\overline{12A}$ and $1\bar{2}A$, which by induction is the character signal A.

Multiple recognition is detected by connection of the character signals via unmatched delay elements 509 and 510 via OR block 511 to binary connected Reject trigger 512, which is normally set to reject but is flipped to OK upon the arrival of the first character signal. Any subsequent character signal flips the Reject trigger back to REJECT, which immediately signals data processor 101 to initiate corrective action.

While the invention has been particulary shown and described with reference to a preferred embodiment thereof, it will be understood by those skilled in the art that the foregoing and other changes in form and details may

What is claimed is:

1. A character recognition system comprising:
   (a) processing control means for producing a sequence of control signals to operate other units of the system, including a scan signal and a step signal;
   (b) a scan unit responsive to the scan signal from said processing control means for scanning a printed character and producing a character pattern of N binary bits representative of the character;
   (c) a scan register unit of N positions settable to the character pattern and capable, when driven by a suitable number of shift pulses of serial rollaround during which the entire content is made available at an output;
   (d) a posture register unit of N positions settable to the character pattern, susceptible to serial rollaround past an output, and responsive to the step signal from said processing control means to shift its contents from one to the next of a sequence of posture patterns;
   (e) a rollaround counter subject to a rollaround control signal to produce N pulses to roll out the contents of both the scan register unit and the posture register unit in unison and to return the contents to their previous positions;
   (f) program unit responsive to preselected numbers of the step signals from said processing control means to provide the rollaround control signal to said rollaround counter, for each of a plurality of checkpoints;
   (g) a correlation unit connected to the outputs of said scan register unit and posture register unit for providing a plurality of correlation counts for each rollaround; and
   (h) recognition means associated with said correlation unit for providing character recognition signals in response to predetermined combinations of correlation counts.

2. A character recognition system according to claim 1 wherein said correlation unit comprises a plurality of logical connect blocks each connected for input to an associated correlation counter, and wherein said recognition means comprises, for each correlation counter, a set of correlation count registers and checkpoint gating means to set respective correlation count registers to the correlation counter values at termination of rollaround for each checkpoint.

3. A character recognition system according to claim 2 wherein said recognition unit comprises, for each character to be recognized, logical means responsive to a preselected bit combination in a preselected combination of said correlation count registers to signal recognition of the associated character.

4. A character recognition system comprising:
   (a) processing control means for producing a sequence of control signals to operate other units of the system, including a scan signal and a step signal;
   (b) a scan unit responsive to the scan signal from said processing control means for scanning a printed character and producing a character pattern of N binary bits representative of the character;
   (c) a scan register unit of N positions settable to the character pattern and capable, when driven by a suitable number of shift pulses of serial rollaround during which the entire content is made available at an output;
   (d) a posture register unit of N positions settable to the character pattern, susceptible to serial rollaround past an output, and responsive to the step signal from said processing control means to shift its contents from one to the next of a sequence of posture patterns;
   (e) a rollaround counter subject to a rollaround control signal to produce N pulses to roll out the contents of both the scan register unit and the posture register unit in unison and to return the contents to their previous positions;
   (f) a program unit responsive to preselected number of step signals from said processing control means to provide the rollaround control signal to said rollaround counter for each of first, second, and third checkpoints;
   (g) a correlation unit comprising first, second and third logical connect blocks related respectively to the functions $A\bar{B}$, $A v B$ and $AB$ where the output of said scan register unit is A and the output of said posture register unit is B, connected to the outputs of said scan register unit and posture register unit, and comprising first, second and third correlation counters respectively connected to the first, second and third logical connect blocks for providing correlation counts for each checkpoint posture; and
   (h) a recognition unit having first, second and third correlation count register sets, respectively connected to said first, second and third correlation counters, each such set including first, second and third checkpoint posture correlation count registers and gates controlled by said program unit to introduce into respective checkpoint posture correlation count registers of each set the related correlation count for checkpoint postures including the first, second and third, and having, for each character to be recognized, logical means responsive to a preselected bit combination in a preselected combination of correlation count registers to signal recognition of the associated character.

5. A character recognition system comprising: a scan register for receiving a character pattern of binary bits; a posture register for receiving the character pattern; means to shift the character in said posture register to each of a plurality of predetermined checkpoint postures; means to rollaround both scan register and posture register in unison past their outputs; and correlation means connected to said scan and posture registers to provide correlation counts at each of the predetermined checkpoint postures; whereby character recognition determination may be made by examination of combinations of checkpoint posture correlation counts.

References Cited in the file of this patent

UNITED STATES PATENTS

| | | |
|---|---|---|
| 2,932,006 | Glauberman | Apr. 5, 1960 |
| 2,963,683 | Demer et al. | Dec. 6, 1960 |